(12) United States Patent
Wolff et al.

(10) Patent No.: US 6,753,278 B2
(45) Date of Patent: Jun. 22, 2004

(54) OPTICAL GLASSES AND THEIR USES

(75) Inventors: Silke Wolff, Hueckeswagen (DE); Ute Woelfel, Mainz (DE); Ulrich Siepe, Wiesbaden (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/137,930

(22) Filed: May 2, 2002

(65) Prior Publication Data

US 2003/0104919 A1 Jun. 5, 2003

(30) Foreign Application Priority Data

May 8, 2001 (DE) .......................................... 101 22 263

(51) Int. Cl.$^7$ ........................... C03C 3/155; C03C 3/15; C03C 3/068

(52) U.S. Cl. .............................. 501/51; 501/78; 501/50; 501/49; 501/77; 501/79

(58) Field of Search .............................. 501/42, 43, 49, 501/50, 51, 52, 74–79, 77, 78, 75, 76

(56) References Cited

U.S. PATENT DOCUMENTS 4,118,238 A * 10/1978 Ishibashi et al. .............. 501/42
4,166,746 A * 9/1979 Ishibashi et al. .............. 501/42
4,226,627 A * 10/1980 Inoue et al. ................... 501/50

FOREIGN PATENT DOCUMENTS

| DE | 1 061 976 | 7/1959 | |
| DE | 26 52 747 | 6/1979 | |
| DE | 3130715 A1 * | 2/1982 | ............ C03C/3/30 |
| DE | 31 02 690 A1 | 8/1982 | |
| DE | 22 65 703 C2 | 6/1985 | |
| JP | 53-25323 | 7/1978 | |
| JP | 5919553 A | 11/1984 | |
| JP | 61163138 A * | 7/1986 | ........... C03C/3/068 |

OTHER PUBLICATIONS

Derwent Abstract 1986–234732, Abstract of JP 61–163138.*
Derwent Abstract 1982–16006E, Abstract of DE 31 30715 A1.*

* cited by examiner

Primary Examiner—Karl Group
Assistant Examiner—Elizabeth A. Bolden
(74) Attorney, Agent, or Firm—Michael J. Striker

(57) ABSTRACT

The optical glass has an index of refraction ($n_d$) greater than or equal to 1.70, an Abbé number ($v_d$) greater than or equal to 35 and a density ($\rho$) less than or equal to 4.5 g/cm$^3$. Optical elements made with this optical glass are especially desirable in optical data transfer applications, particularly in read-write devices with movable read-write heads. The glass compositions required to make optical glass with these properties are described.

7 Claims, No Drawings

OPTICAL GLASSES AND THEIR USES

BACKGROUND OF THE INVENTION

1. Field of the Invention

The subject matter of the present invention includes optical glasses with indices of refraction $n_d \geq 1.70$, with Abbé numbers $v_d \geq 35$ and with densities $\rho \leq 4.5$ g/cm$^3$, optical elements or components made from these optical glasses with these properties and to devices including these optical elements. Also the invention includes compositions for making glasses having these properties.

2. Description of the Related Art

The current trend in optical data transfer/imaging/telecommunications fields is in the direction of ever-smaller device layouts and higher data transfer rates. Also the traditional "read-only" technology devices in all sectors of these fields are being forced out ever more completely by "read-write" technology devices. The specifications for optical materials and optical systems are always changing because of these considerations and trends.

Read-only-technologies can be operated in monochromatic modes in separate operations (reading or writing) rigorously separated from each other in both time and space. Because of this separation the writing process can be performed with light of the same wavelength as the reading process that occurs during a later operation. However this is not possible in "read-write" technology. In this latter technology the wavelength of the energy-rich write beam must be about 2 to 5 nm lower than that of the energy-poor read beam. Otherwise the apparatus cannot operate both modes in the same optical head and the system expenses and costs of the apparatus become unacceptably large.

This wavelength difference results from the necessity of maintaining the read beam and the write beam in the optical system cleanly separated from each other, in order to prevent serious imaging errors because of interference and residual effects. The smaller the difference between both wavelengths that is required in order to maintain a complete separation, the simpler is the resulting optical system. The term "simpler" relates to both the minimum size of the module and also the costs involved in making it.

The minimum wavelength difference required for complete separation however depends on the dispersion of the glass components of the optical system. The higher the dispersion, also the less the Abbé number, the more both never-ideally-monochromatic beams are spatially spread out, until they finally overlap which hinders the desired separation. This means that the less the dispersion of the glass, the smaller the wavelength difference that can be tolerated while maintaining complete separation. One additional advantage results from a smaller dispersion: Definitely smaller wavelengths can be used given an equal minimum wavelength difference. Generally the dispersion of the beams is greater at smaller wavelengths. Generally the minimum allowable operating wavelength increases, as well as the minimum wavelength difference, for glasses with higher dispersion in contrast to glasses with lower dispersion. A working range with lower wavelengths is preferable in many fields, since the smaller the working wavelengths are, the more information per unit surface area can be packed onto a data recording media. When the information density is maximized, the resulting shorter beam paths minimize retrieval times.

The index of refraction is of significance for practical optical systems. The individual pick-up lenses determine the focal length or distance of the system decisively because of their indices of refraction as well as the absolute wavelength of the read-write beams. The smaller the focal length of the optical system, the smaller are its spatial dimensions and thus the component size as well as the weight and cost are less. A higher index or refraction is essential in the wavelength range decisive for the particular application. An additional advantage of the high index of refraction is that the aspheric coating of the pick-up lenses can be comparatively thin. Smaller index of refraction values for the glass would require large coating thickness in order to obtain the desired effect. The required coating thickness directly affects the number of process steps required for the coating process as a parameter and thus enters into the costs and expenses. High transmission in the working wavelength range of the system is regarded as essential. The less the transmission of the glass at the working wavelengths, the poorer is the light yield of the system. Since the light intensity however enters directly into the read-write quality of the system, light sources of higher power are required. Also the cooling unit connected with the light source must be of higher power. Thus costs and work increase.

Besides the above-mentioned optical properties also additional physical and chemical properties of the glasses are important. These properties include a reduced density and a satisfactory ability to be coated, especially with organic materials.

The density of the optical materials of these systems is of great significance. The pick-up lenses acting as components of the read-write head are moving elements of the system. The head moves over the recording medium for individual data transfer operations. The retrieval time and track densities thus depend on rapid and exact positioning of the head. The greater the density of the glass components, the greater the mass of this mobile unit. Thus it has greater inertia and is more slowly put in position for the data transfer.

The aspheric coating of the lenses usually includes organic material. In order to obtain sufficient adherence of the optical coating on the base glass, the material must contain organic binding or strongly adhesion-promoting ingredients in sufficient amounts.

The patent literature already includes a few references, in which glasses with values for the optical properties $n_d$ and $v_d$ having the above-mentioned ranges or limits are described. However those glasses have a number of different disadvantages as explained in more detail hereinbelow.

DE-AS 10 61 976 describes glasses from the three-component system $B_2O_3$—$SiO_2$—$La_2O_3$. These glasses, comprising green glass and numerous additional components, vary strongly in their compositions. They are however both $GeO_2$ and also $Yb_2O_3$ free. They are not easily coated however. The same goes for the glasses of DE 31 02 690 A1, for the glasses of DE-AS 26 52 747 from the $B_2O_3$—$La_2O_3$—$Y_2O_3$—$TiO_2$ system. It is also true for the glasses from the $B_2O_3$—$Gd_2O_3$—$La_2O_3$ system.

The glasses of JP 53-25323 A have in contrast a high $Yb_2O_3$ content of up to 40 percent by weight and turning to the examples a high $Ta_2O_5$ content or a high alkaline earth oxide content. Because of the extremely high $Yb_2O_3$ these glasses have a strong inclination to crystallize.

The glasses described in U.S. Pat. No. 4,166,748 and JP 59-1955523 A do not have an advantageous combination of low density, low dispersion and large index of refraction.

SUMMARY OF THE INVENTION

Thus it is an object of the present invention to provide optical glasses and optical components that are made from them, especially for read-write applications, which meet the above-stated specifications.

It is a further object of the present invention to provide optical glasses for optical components, which have indices of refraction $n_d \geq 1.70$, Abbé numbers $v_d \geq 35$ and densities $\rho \leq 4.5$ g/cm$^3$.

These specifications are met by all the embodiments of the present invention claimed in the appended claims.

According to the present invention the optical glasses have indices of refraction $n_d \geq 1.70$, Abbé numbers $v_d \geq 35$ and densities $\rho \leq 4.5$ g/cm$^3$. Optical elements and components including these optical glasses are also part of the present invention and are especially desirable as optical elements or components in devices for optical data transfer.

The densities of the optical glasses according to the invention are preferably less than or equal to 4.3 g/cm$^3$, more preferably 4.2 g/cm$^3$.

The indices of refraction of the glasses according to the invention $n_d$ are preferably greater than or equal to 1.71, more preferably greater than or equal to 1.73 and especially preferably greater than or equal to 1.75.

The Abbé numbers of the glasses according to the invention $v_d$ are preferably greater than or equal to 40, especially preferably greater than or equal to 45.

However according to the particular application an Abbé number of greater than or equal to 35 can be sufficient if the glass as an especially low density of, for example, less than or equal to 4.0 g/cm$^3$. Also this embodiment and further advantageous combinations are preferred.

The optical elements or components of the invention can include lenses, such as spherical or aspheric lenses, spherical lenses or hemispherical lenses, prisms of different geometries and so-called compact structural elements. Compact structural elements include elements, which are shaped like lenses and/or prisms.

According to the invention it has been established that optical glasses in the following classes or categories which are described in detail hereinbelow have both the required values of index of refraction, Abbé number and density and are suitable for making optical components or elements.

The present invention also relates to methods of using optical glasses, which have indices of refraction $n_d \geq 1.70$, Abbé numbers $v_d \geq 35$ and densities $\rho \leq 4.5$ g/cm$^3$, for optical data transfer, especially for "read-write" applications, for example for "read-write" devices with mechanically moving read-write heads.

Surprisingly it has been shown that optical elements, which include the optical glasses described in detail here, are suitable for energetic radiation in the blue-violet spectral range, for example 405 nm.

Optical glasses suitable for the optical elements according to the invention especially include the glasses from the following four classes. The present invention thus relates to the use of the optical glasses described here in the field of optical data transfer, especially for pick-up lenses for "read-only" or "write-only" technology, preferably for "read-write" technology.

In the first of the classes or categories of glasses according to the invention it is a matter of a new types of glasses, which have the above-described properties. These glasses are especially suitable for optical elements or components according to the invention, or to methods of using the optical glasses according to the invention.

The present invention relates to glasses of the above-described first two classes of glasses to be described next.

The first two classes of glasses originate from the lanthanate borate glass system. The $La_2O_3$ content amounts to from 30 to 55 percent by weight, and the $B_2O_3$ content, from 20 to 40 percent by weight. The boron oxide acts as a solvent for the lanthanum oxide, by which a high index of refraction and a high Abbé number are simultaneously obtained. In order to provide enough $B_2O_3$ content for this purpose, in preferred embodiments of the invention the weight ratio $La_2O_3/B_2O_3$ is at most 1.5, especially preferably 1.4. Especially in $SiO_2$ rich glasses separation effects and crystallization could appear at high $La_2O_3/B_2O_3$ ratios.

When the $B_2O_3$ content is high, especially in connection with a low $La_2O_3$ content, the chemical resistance of the glass is poor and would lead to too much evaporation during production. Also the lower viscosity at the same temperatures increases the tendency to crystallize because of the higher migration speed of the ingredients. Thus the weight ratio $La_2O_3/B_2O_3$ is preferably less than 1.0. The desired optical condition would not be attained with a too low $La_2O_3$ content.

To improve the resistance of the glasses according to the invention to crystallization the glasses can contain up to five percent by weight of the additional glass former $Al_2O_3$. The higher the $Al_2O_3$ content the lower the Abbé number and the poorer the meltability of the glasses. The glasses can contain up to 10 percent by weight ZnO, preferably up to 8 percent by weight ZnO, to improve their resistance to crystallization. The higher the ZnO content, the lower the index of refraction. The ZnO content amounts to preferably at least 2 percent by weight, more preferably at least 3 percent by weight.

The glasses contain from 0 to 10 percent by weight $Nb_2O_5$, 0 to 11 percent by weight $Y_2O_3$ and/or 0 to 10 percent by weight $ZrO_2$. All three of these ingredients act to give the glasses lower dispersion and also a higher Abbé number. A higher content of $Y_2O_3$ and $Nb_2O_5$ strongly increase the cost of the mixture. Also higher amounts of $Y_2O_3$ impart a yellowish color to the glasses. Higher amounts of $ZrO_2$ and $Nb_2O_5$ would greatly increase the tendency to crystallize in these glasses with a high lanthanum oxide content, since these components can function as nuclei formers. The above-mentioned disadvantages are minimized by the simultaneous presence of all three ingredients. Preferably the sum of the $Y_2O_3$ and $Nb_2O_5$ and $ZrO_2$ content amounts to at least 2 percent by weight, more preferably 5 percent by weight.

The glasses according to the invention can contain from 0 to 8 percent by weight $SiO_2$, 0 to 15 percent by weight $GeO_2$ and 0 to 5 percent by weight PbO.

The ability of the glass to absorb organic layers is increased by these ingredients. Also the PbO increases the index of refraction.

Preferably the sum of the $SiO_2$ and $GeO_2$ and PbO content amounts to at least 2 percent by weight. The proportion of PbO is limited to the above-mentioned maximum value since the Abbé number is dramatically reduced and the density is increased otherwise. If the $SiO_2$ content is too great, separation of ingredients is caused and the index of refraction decreases too much.

The same is true, but to a lesser extent for $GeO_2$. Thus the presence of $GeO_2$ instead of $SiO_2$ is preferred.

Structural changes, which permit an increased $SiO_2$ content, take place in the glasses already at reduced amounts of $GeO_2$ of 0.5 percent by weight. An increased amount of $Nb_2O_5$ can be added because of the increased amount of glass formers in this way, without leading to crystallization of the glasses.

The glasses can contain $Yb_2O_3$, and of course up to 5 percent by weight.

Also $Yb_2O_3$ increases the index of refraction. The desired value can be varied with the help of the ingredients $GeO_2$ and $Yb_2O_3$ which act oppositely in this regard in actual glass compositions. Thus the sum of the $GeO_2$ and $Yb_2O_3$ content should be at least 0.1 percent by weight, preferably at least 0.5 percent by weight. The maximum added amount of lanthanum oxide is limited by its limited solubility in the borate glass matrix. $Yb_2O_3$ has comparable properties and is thus used to complement it.

The additional facultative ingredients $TiO_2$ (0 to 5 wt. %), MgO (0 to 8 wt. %),CaO (0 to 8 wt. %), BaO (0 to 8 wt. %), SrO (0 to 8 wt. %), $Gd_2O_3$ (0 to 5 wt. %) assist in the fine adjustment of the optical properties. Of these ingredients the MgO, CaO and SrO increase the Abbé number. BaO increases the index of refraction. $TiO_2$ increases the index of refraction but decreases the Abbé number. Furthermore MgO, SrO and CaO have a positive effect on the desired low density. The sum of the MgO, CaO, SrO and BaO content is limited to 10 percent by weight, and especially preferably to 8 percent by weight.

Furthermore the glasses can contain up to 10 percent by weight of alkali oxides, namely $Li_2O$, $Na_2O$, $K_2O$, $Rb_2O$ and $Cs_2O$. The index of refraction can thus be adjusted and the meltability can be improved, which is of special importance for the high melting glasses, above all for the high lanthanum oxide and glass former containing glasses. It is preferable that the above-mentioned alkali oxide content of 0 to 10 percent by weight is realized by $Li_2O$, $Na_2O$ and/or $K_2O$. It is especially preferred when the sum of the $Li_2O$, the $Na_2O$ and the $K_2O$ content amounts to up to eight percent by weight.

The first two classes of glasses are described in detail in the following. The first of the two classes of glasses is characterized by an especially reliable ability to adsorb organic material to form an organic layer.

The first class of glasses are PbO-containing glasses having compositions with the following oxide content (in percent by weight on the basis of oxides): $La_2O_3$, 30 to 45, preferably 32 to 42; $B_2O_3$, 30 to 40; PbO, 0.1 to 5, especially preferably 0.5 to 4; MgO, 0 to 8; CaO, 0 to 8; SrO, 0 to 8; with MgO+CaO+SrO+BaO, 0 to 10, even more preferably 0 to 8; ZnO, 1 to 10, especially preferably 2 to 8; $TiO_2$, 0 to 5, especially preferably 0 to 2; $ZrO_2$, 1 to 10, especially preferably 3 to 10; $Y_2O_3$, 1 to 8, especially preferably 1 to 5; $Yb_2O_3$, 0.1 to 5, especially preferably 0.5 to 2; $Gd_2O_3$, 0.1 to 5, preferably 0.1 to 3; $Nb_2O_5$, 0.1 to 10, preferably 2 to 10; especially preferably 4 to 10.

These glasses have indices of refraction $n_d \geq 1.74$, Abbé numbers $v_d \geq 40$ and densities $\rho \leq 4.5$ g/cm³. The glasses in the paragraph above that are disclosed as especially preferred with the especially preferred ingredient composition ranges have indices of refraction $n_d \geq 1.76$, Abbé numbers $v_d \geq 42$ and densities $\rho \leq 4.2$ g/cm³. Since the solubility of the lanthanum oxides in the lead-containing borate glass matrix is less than in the lead free embodiments, the $Yb_2O_3$ is also a continuously present ingredient in these lead free glasses.

For example the glasses of this first class can have the following composition (in percent by weight on the basis of their oxide content):

| | |
|---|---|
| $La_2O_3$ | 30 to 45 |
| $B_2O_3$ | 30 to 40 |
| PbO | 0.1 to 5 |
| MgO | 0 to 8 |
| CaO | 0 to 8 |
| SrO | 0 to 8 |
| BaO | 0 to 8 |
| ZnO | 1 to 10 |
| $TiO_2$ | 0 to 5 |
| $ZrO_2$ | 1 to 10 |
| $Y_2O_3$ | 1 to 8 |
| $Yb_2O_3$ | 0.1 to 5 |
| $Gd_2O_3$ | 0.1 to 5 |
| $Nb_2O_5$ | 0.1 to 10 |
| With MgO + CaO + SrO + BaO | 0 to 10 |

Preferably the glasses of this first class according to the invention have the following preferred compositions (in percent by weight on the basis of oxide content):

| | |
|---|---|
| $La_2O_3$ | 30 to 45 |
| $B_2O_3$ | 30 to 40 |
| PbO | 0.1 to 5 |
| MgO | 0 to 8 |
| CaO | 0 to 8 |
| SrO | 0 to 8 |
| BaO | 0 to 8 |
| ZnO | 1 to 10 |
| $TiO_2$ | 0 to 5 |
| $ZrO_2$ | 1 to 10 |
| $Y_2O_3$ | 1 to 8 |
| $Yb_2O_3$ | 0.1 to 5 |
| $Gd_2O_3$ | 0.1 to 3 |
| $Nb_2O_5$ | 2 to 10 |
| With MgO + CaO + SrO + BaO | 0 to 10 |

Even more preferred embodiments of the first class of the glasses according to the invention have the following composition (in percent by weight on the basis of oxide content):

| | |
|---|---|
| $La_2O_3$ | 32 to 42 |
| $B_2O_3$ | 30 to 40 |
| PbO | 0.5 to 4 |
| MgO | 0 to 8 |
| CaO | 0 to 8 |
| SrO | 0 to 8 |
| BaO | 0 to 8 |
| ZnO | 2 to 8 |
| $TiO_2$ | 0 to 2 |
| $ZrO_2$ | 3 to 10 |
| $Y_2O_3$ | 1 to 5 |
| $Yb_2O_3$ | 0.5 to 2 |
| $Gd_2O_3$ | 0.1 to 3 |
| $Nb_2O_5$ | 4 to 10 |
| With MgO + CaO + SrO + BaO | 0 to 10 |

The glasses of the first class according to the invention are especially economical and crystallization stable.

The glasses of the second class are $GeO_2$ containing glasses having the following general composition (in percent by weight on the basis of oxide content): $La_2O_3$, 35 to 50, preferably 38 to 48; $B_2O_3$, 30 to 40; $SiO_2$, 0 to 8, preferably 0 to 5; $GeO_2$, 0.1 to 15, preferably 0.5 to 13; preferably with $GeO_2+SiO_2$, 5 to 13; MgO, 0 to 5, preferably 0 to 2; CaO, 0.1 to 7, preferably 0.1 to 5; SrO, 0 to 2; BaO, 0.1 to 70, preferably 0.1 to 5; ZnO, 0 to 5, preferably 0 to 3; $ZrO_2$, 0.1 to 8, preferably 0.5 to 6; $Y_2O_3$, 0.1 to 6, preferably 0.1 to 4; $Gd_2O_3$, 0 to 5, preferably $Gd_2O_3$ free; and $Nb_2O_5$, 1 to 10, preferably 3 to 7.

These glasses have indices of refraction $n_d \geq 1.70$, Abbé numbers $v_d \geq 45$ and densities $\rho \leq 4.4$ g/cm³. The glasses according to the invention of this second class in the paragraph above that are disclosed as preferred with the preferred ingredient composition ranges have indices of refraction $n_d \geq 1.72$, Abbé numbers $v_d \geq 47$ and densities $\rho \leq 4.1$ g/cm³. These glasses preferably contain a maximum of 10 percent by weight of alkaline earth oxides, especially preferably a maximum of 8 percent by weight, and more preferable a maximum of 6% by weight of the alkaline earth oxides.

For example the glasses of this second class can have the following composition (in percent by weight on the basis of their oxide content):

| | |
|---|---|
| $La_2O_3$ | 35 to 50 |
| $B_2O_3$ | 30 to 40 |
| $SiO_2$ | 0 to 8 |
| $GeO_2$ | 0.1 to 15 |
| MgO | 0 to 5 |
| CaO | 0.1 to 7 |
| SrO | 0 to 2 |
| BaO | 0.1 to 7 |
| ZnO | 0 to 5 |
| $ZrO_2$ | 0.1 to 8 |
| $Y_2O_3$ | 0.1 to 6 |
| $Gd_2O_3$ | 0 to 5 |
| $Nb_2O_5$ | 1 to 10 |

Preferably the glasses of this second class according to the invention have the following preferred compositions (in percent by weight on the basis of oxide content):

| | |
|---|---|
| $La_2O_3$ | 38 to 48 |
| $B_2O_3$ | 30 to 40 |
| $SiO_2$ | 0 to 5 |
| $GeO_2$ | 0.5 to 13 |
| With $SiO_2$ + $GeO_2$ | 5 to 13 |
| MgO | 0 to 2 |
| CaO | 0.1 to 5 |
| SrO | 0 to 2 |
| BaO | 0.1 to 5 |
| ZnO | 0 to 3 |
| $ZrO_2$ | 0.5 to 6 |
| $Y_2O_3$ | 0.1 to 4 |
| $Nb_2O_5$ | 3 to 7 |

The glasses of this second class have an especially preferred combination of the properties, density, index of refraction and dispersion.

The glasses of the third class of glasses according to the invention have the following composition (in percent by weight on the basis of oxide content):

| | |
|---|---|
| $La_2O_3$ | 40 to 55 |
| $B_2O_3$ | 22 to 32 |
| $SiO_2$ | 1 to 8 |
| $Al_2O_3$ | 0 to 5 |
| MgO | 0 to 8 |
| CaO | 0 to 8 |
| SrO | 0 to 8 |
| BaO | 0 to 2 |
| ZnO | 0.5 to 6 |
| $TiO_2$ | 0 to 3 |
| $ZrO_2$ | 2 to 10 |
| $Y_2O_3$ | 3 to 11 |
| $M_2O$ (M = Li, Na, K, Rb and/or Cs) | 0 to 8 |

Preferably this third class of glasses according to the invention has the following preferred composition (in percent by weight on the basis of oxide content):

| | |
|---|---|
| $La_2O_3$ | 45 to 50 |
| $B_2O_3$ | 26 to 29 |
| $SiO_2$ | 4 to 7 |
| $Al_2O_3$ | 0 to 5 |
| BaO | 0 to 2 |
| ZnO | 2 to 5 |
| $TiO_2$ | 0 to 3 |
| $ZrO_2$ | 6 to 9 |
| $Y_2O_3$ | 7 to 10 |

The glasses of the fourth class of glasses according to the invention have the following composition (in percent by weight on the basis of oxide content):

| | |
|---|---|
| $La_2O_3$ | 10 to 16 |
| $B_2O_3$ | 1 to 8 |
| $SiO_2$ | 20 to 30 |
| $Al_2O_3$ | 0 to 3 |
| MgO | 0 to 8 |
| CaO | 20 to 30 |
| SrO | 0 to 8 |
| BaO | 0 to 8 |
| ZnO | 1 to 8 |
| $TiO_2$ | 3 to 11 |
| $ZrO_2$ | 0.5 to 6 |
| $Nb_2O_5$ | 10 to 18 |
| $M_2O$ (M = Li, Na, K, Rb and/or Cs) | 0 to 8 |

Preferably this fourth class of glasses according to the invention has the following preferred composition (in percent by weight on the basis of oxide content):

| | |
|---|---|
| $La_2O_3$ | 12 to 16 |
| $B_2O_3$ | 3 to 7 |
| $SiO_2$ | 22 to 28 |
| $Al_2O_3$ | 0 to 1.5 |
| CaO | 20 to 27 |
| ZnO | 3 to 8 |
| $TiO_2$ | 6 to 11 |
| $ZrO_2$ | 2 to 6 |
| $Nb_2O_5$ | 12 to 16 |
| $Li_2O$ | 0 to 1.5 |

To improve the glass quality by refining one or more known refining agents can be added to the mixture of oxides used to prepare the glasses of the invention in amounts that are customary for refining agents. The glass produced using the refining agents has an especially good quality in regard to bubbles and schlieren present, especially it can be bubble free and schlieren free. The glasses according to the invention can therefore include the following ingredients: $Sb_2O_3$, 0 to 1.5 percent by weight; $As_2O_3$, 0 to 1.5 percent by weight; $SnO_2$, 0 to 1.5 percent by weight; $CeO_2$, 0 to 1.5 percent by weight; $Cl^-$, 0 to 1.5 percent by weight; $SO_4^-$, 0 to 1.5 percent by weight. When more than one of the foregoing refining ingredients are included in the glasses the some total of foregoing ingredients should be between 0 to 1.5 percent by weight.

The following examples should serve to illustrate the present invention, without limiting the claims appended hereinbelow.

EXAMPLES

Nine examples of the glasses according to the invention were made from a mixture of the customary starting or raw materials. In Table II their compositions (in percent by weight on the basis of oxide content), their indices of refraction $n_d$, their Abbé numbers $v_d$, their partial dispersion in the blue region of the spectrum $P_{g,F}$ and their anomalies of the partial dispersion $\Delta P_{g,F}$ [$10^{-4}$]. Furthermore the thermal expansion coefficient $\alpha_{20/300}$[$10^{-6}$/K], the transition temperature $T_g$[° C.], the density $\rho$[g/cm$^3$] and the Knoop hardness [HK] are also tabulated. The spectral transmission purity degree $\tau_i$[%] for a sample thickness d =25 mm ($\tau_{i25\ mm}$) is tabulated for a wavelength $\lambda$ of 380 nm, 400 nm and 420 nm.

The glasses according to the invention were made by the following method: The oxides and/or the raw materials for the oxides, preferably the carbonates, nitrates and/or also the fluorides, were weighed out. They were then well mixed. The glass ingredient mixture was melted at about 1350° C. in a continuous melting unit. After that the mixture was refined at about 1380° C. and homogenized. The glass was worked at a casting temperature of about 1140° C., e.g. it was pressed or rolled, definitely cooled and, if necessary, was further processed to the desired dimensions.

Table I shows an example of how a glass is made with a particular composition of ingredients and what raw materials are mixed to make the glass. The amounts of the raw materials are computed on the basis of 100 kg of a starting mixture.

TABLE I

RAW MATERIALS AND COMPOSITION OF AN EXEMPLARY GLASS OF THE INVENTION

| Oxide | Wt. % | Raw material | Weight [kg] |
|---|---|---|---|
| $B_2O_3$ | 35.0 | $H_3O_3$ | 62.2 |
| $La_2O$ | 33.0 | $La_2O_3$ | 33.0 |
| PbO | 3.0 | PbO | 3.0 |
| ZnO | 3.0 | ZnO | 3.0 |
| $TiO_2$ | 1.0 | $TiO_2$ | 1.0 |
| $ZrO_2$ | 10.0 | $ZrO_2$ | 10.0 |
| $Y_2O_3$ | 3.0 | $Y_2O_3$ | 3.0 |
| $Gd_2O_3$ | 2.0 | $Gd_2O_3$ | 2.0 |
| $Nb_2O_3$ | 10.0 | $Nb_2O_3$ | 10.0 |

The properties of the glass obtained from the raw materials of table I are tabulated in Table II as example 4.

The following Tables II and III include compositions (in percent by weight based on oxides) and physical properties of examples 1 to 19 of the glasses according to the invention.

TABLE II

COMPOSITIONS AND PROPERTIES OF GLASSES ACCORDING TO THE INVENTION

| | 1 | 2 | 3 | 4 | 5 | 6 | 7 | 8 | 9 |
|---|---|---|---|---|---|---|---|---|---|
| $La_2O_3$ | 37.3 | 32.0 | 42.0 | 42.6 | 45.0 | 30.0 | 40.0 | 42.0 | 43.0 |
| $B_2O_3$ | 35.3 | 32.0 | 40.0 | 34.7 | 40.0 | 30.0 | 35.0 | 40.0 | 36.0 |
| $SiO_2$ | — | — | — | — | — | 2.5 | 6.0 | — | — |
| $GeO_2$ | — | — | — | 9.1 | 12.0 | 6.0 | 0.5 | 2.0 | 4.0 |
| PbO | 1.9 | 0.5 | 4.0 | — | — | — | — | — | — |
| $Al_2O_3$ | — | 5.0 | — | — | — | 4.0 | — | — | — |
| MgO | — | — | — | 0.7 | 0.4 | 2.0 | 1.5 | 2.0 | — |
| CaO | — | — | — | 1.1 | 0.1 | 5.0 | 3.0 | 0.5 | 1.0 |
| SrO | — | — | — | 1.0 | — | — | — | — | 2.0 |
| BaO | — | — | — | 1.4 | 0.1 | 4.5 | 3.0 | 0.5 | 2.0 |
| ZnO | 5.5 | 8.0 | 4.0 | 1.0 | 0.4 | 3.0 | 3.0 | 3.0 | — |
| $TiO_2$ | 0.1 | 4.5 | — | — | — | — | — | — | — |
| $ZrO_2$ | 7.8 | 3.0 | 3.0 | 2.6 | 0.5 | 1.0 | 2.0 | 5.0 | 4.0 |
| $Y_2O_3$ | 2.9 | 4.0 | 1.0 | 1.0 | 0.5 | 3.0 | 3.0 | 2.0 | 2.0 |
| $Yb_2O_3$ | 0.6 | 2.0 | 1.0 | — | — | — | — | — | — |
| $Gd_2O_3$ | 0.8 | 3.0 | 0.5 | — | — | — | — | — | — |
| $Nb_2O_5$ | 7.7 | 5.0 | 4.5 | 4.8 | 1.0 | 5.0 | 3.0 | 3.0 | 6.0 |
| $K_2O$ | — | 1.0 | — | — | — | — | — | — | — |
| $Na_2O$ | — | — | — | — | — | 4.0 | — | — | — |
| $n_d$ | 1.779 | 1.775 | 1.760 | 1.749 | 1.713 | 1.746 | 1.729 | 1.733 | 1.748 |
| $v_d$ | 43.7 | 44.7 | 46.5 | 48.1 | 51.6 | 48.4 | 51.3 | 50.3 | 47.7 |
| $P_{g;F}$ | 0.562 | 0.567 | 0.557 | 0.555 | 0.553 | 0.555 | 0.550 | 0.549 | 0.555 |
| $\Delta P_{g;F}$* | −75 | −14 | −79 | −76 | −72 | −69 | −76 | −93 | −83 |
| $\alpha_{20/300}$*' | 6.3 | 6.4 | 6.5 | 6.5 | 6.9 | 7.5 | 7.0 | 6.4 | 6.5 |
| $T_g$ [° C.] | 643 | 635 | 628 | 656 | 648 | 636 | 648 | 644 | 655 |
| $\rho$, [g/cm$^3$] | 4.12 | 4.14 | 4.15 | 4.05 | 3.97 | 4.02 | 3.91 | 3.88 | 3.96 |
| HK** | 740 | 770 | 770 | 720 | 730 | 720 | 730 | 740 | 730 |
| $\tau_{i25mm}$ % at | | | | | | | | | |
| 380 nm | 54.1 | 62.9 | 55.4 | 59.0 | 65.6 | 80.7 | 66.4 | 69.7 | 73.7 |
| 400 nm | 73.7 | 80.3 | 70.8 | 75.4 | 78.7 | 88.4 | 81.0 | 82.6 | 84.1 |
| 420 nm | 83.5 | 87.5 | 80.9 | 84.8 | 86.3 | 91.8 | 88.5 | 88.3 | 89.3 |

**Knoop Hardness;
*multiply values for $\Delta P_{g;F}$ by $10^{-4}$;
*'units of $\alpha$ $10^{-6}$/K

TABLE III

GLASS COMPOSITIONS AND PROPERTIES (CON)

| | 10 | 11 | 12 | 13 | 14 | 15 | 16 | 17 | 18 | 19 |
|---|---|---|---|---|---|---|---|---|---|---|
| $La_2O_3$ | 13.5 | 9.9 | 14.9 | 11.9 | 10.0 | 46.9 | 39.7 | 41.8 | 49.7 | 54.7 |
| $B_2O_3$ | 5.0 | 8.0 | 1.0 | 6.0 | 5.0 | 27.8 | 29.7 | 21.8 | 31.7 | 24.9 |
| $SiO_2$ | 25.0 | 19.8 | 29.8 | 24.8 | 28.6 | 5.3 | 1.0 | 8.0 | 4.0 | 7.8 |
| $Al_2O_3$ | 0.5 | 3.0 | 3.0 | — | 1.0 | — | — | — | — | — |
| MgO | — | 7.0 | — | — | 1.0 | — | 1.0 | — | 0.5 | — |
| CaO | 23.3 | 17.8 | 19.8 | 24.8 | 30.0 | — | — | — | — | — |
| BaO | — | — | — | — | — | 0.3 | 2.0 | 1.0 | 0.5 | — |
| ZnO | 5.0 | 8.0 | 8.0 | 5.0 | 1.0 | 3.3 | 6.0 | 6.0 | 0.5 | 4.0 |
| $TiO_2$ | 9.0 | 5.0 | 7.0 | 3.0 | 10.5 | 0.4 | 3.0 | — | 1.0 | 3.0 |
| $ZrO_2$ | 4.0 | 4.0 | 0.5 | 6.0 | 1.5 | 7.6 | 8.0 | 9.9 | 5.0 | 2.0 |
| $Y_2O_3$ | — | — | — | — | — | 8.3 | 8.0 | 10.9 | 6.5 | 3.0 |
| $Nb_2O_5$ | 14.0 | 16.4 | 14.9 | 17.9 | 9.9 | — | — | — | — | — |
| $K_2O$ | — | — | 0.3 | — | — | — | 1.0 | 0.3 | — | — |
| $Na_2O$ | — | 0.3 | — | 0.3 | 0.5 | — | 0.3 | — | 0.3 | — |
| $Li_2O$ | 0.7 | 0.5 | 0.5 | — | 0.5 | — | — | — | — | — |
| $Sb_2O_3$ | — | 0.3 | 0.3 | 0.3 | 0.4 | 0.1 | 0.3 | 0.3 | 0.3 | 0.3 |
| $n_d$ | 1.801 | 1.782 | 1.776 | 1.780 | 1.763 | 1.773 | 1.782 | 1.791 | 1.760 | 1.782 |
| $v_d$ | 35.08 | 36.70 | 36.17 | 37.61 | 36.69 | 49.62 | 45.36 | 47.58 | 49.82 | 46.24 |
| $P_{g;F}$ | | | | | | | | | | |
| $\Delta P_{g;F}$* | | | | | | | | | | |
| $\alpha_{20/300}$*' | 8.6 | 8.7 | 8.0 | 8.4 | 8.8 | 7.0 | 7.1 | 7.3 | 7.1 | 7.3 |
| $T_g$ [° C.] | 651 | 620 | 669 | 665 | 663 | 668 | 639 | 660 | 662 | 654 |
| $\rho$, [g/cm$^3$] | 3.60 | 3.60 | 3.63 | 3.63 | 3.37 | 4.24 | 4.19 | 4.39 | 4.16 | 4.32 |
| HK** | 670 | 610 | 700 | 650 | 650 | 770 | 720 | 750 | 730 | 730 |
| $\tau_{i25\ mm}$ % at | | | | | | | | | | |
| 380 nm | | | | | | | | | | |
| 400 nm | | | | | | | | | | |
| 420 nm | | | | | | | | | | |

**Knoop Hardness;
*multiply values for $\Delta P_{g;F}$ by $10^{-4}$;
*'units of $\alpha$ $10^{-6}$/K The lanthanum crown glass, the lanthanum flint glass and the lanthanum heavy flint glass according to the invention have a low density for these optical conditions at the above-stated high Abbé numbers and high index of refraction values with $\rho \leq 4.5$ g/cm$^2$.

They have a very good blue and UV-transmission, especially in comparison with the known glasses for these optical conditions or applications.

The glasses can be satisfactorily coated with organic materials because of their layer binding components. The applied layers have very good adherence on the glass.

The glasses are easily melted and easily and satisfactorily worked or processed. Their crystallization stability, their meltability and their viscosity curve make their manufacture possible in continuous units.

They are outstandingly suitable for use as component glass in optical data transfer systems, especially as a base glass for pick-up lenses, because of the property profile.

The disclosure in German Patent Application 101 22 263.7-45 of May 8, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in optical glasses and their uses, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An optical glass having an index of refraction ($n_d$) greater than or equal to 1.71, an Abbénumber ($v_d$) greater than or equal to 39 and a density ($\rho$) less than or equal to 4.7 g/cm$^3$, wherein said optical glass consists of (in percent by weight on an oxide basis):

| | |
|---|---|
| $La_2O_3$ | 30 to 45 |
| $B_2O_3$ | 30 to 40 |
| $Al_2O_3$ | 0 to 5 |
| PbO | 0.1 to 5 |
| $Li_2O$ | 0 to 10 |
| $Na_2O$ | 0 to 10 |
| $K_2O$ | 0 to 10 |
| $Rb_2O$ | 0 to 10 |
| $Cs_2O$ | 0 to 10 |
| MgO | 0 to 8 |
| CaO | 0 to 8 |
| SrO | 0 to 8 |
| BaO | 0 to 8 |
| ZnO | 1 to 10 |
| $TiO_2$ | 0 to 5 |
| $ZrO_2$ | 1 to 10 |
| $Y_2O_3$ | 1 to 8 |
| $Yb_2O_3$ | 0.1 to 2 |
| $Gd_2O_3$ | 0.1 to 5 |
| $Nb_2O_6$ | 0.1 to 10 |

-continued

| | |
|---|---|
| With MgO + CaO + SrO + BaO | 0 to 10 |
| With $Li_2O$ + $Na_2O$ +]$K_2O$ $Rb_2O$ + $Cs_2O$; | 0 to 10 | and from 0 to 1.5 percent by weight of at least one refining agent, wherein said at least one refining agent is selected from the group consisting of $Sb_2O_3$, $As_2O_3$, $SnO_2$ and $CeO_2$.

2. An optical glass having an index of refraction ($n_d$) greater than or equal to 1.71, an Abbénumber ($v_d$) greater than or equal to 39 and a density ($\rho$) less than or equal to 4.7 g/cm³, wherein said optical glass consists of (in percent by weight on an oxide basis):

| | |
|---|---|
| $La_2O_3$ | 30 to 45 |
| $B_2O_3$ | 30 to 40 |
| $Al_2O_3$ | 0 to 5 |
| PbO | 0.1 to 5 |
| $Li_2O$ | 0 to 8 |
| $Na_2O$ | 0 to 8 |
| $K_2O$ | 0 to 8 |
| MgO | 0 to 8 |
| CaO | 0 to 8 |
| SrO | 0 to 8 |
| BaO | 0 to 8 |
| ZnO | 1 to 10 |
| $TiO_2$ | 0 to 5 |
| $ZrO_2$ | 1 to 10 |
| $Y_2O_3$ | 1 to 8 |
| $Yb_2O_3$ | 0.1 to 2 |
| $Gd_2O_3$ | 0.1 to 3 |
| $Nb_2O_5$ | 2 to 10 |
| with MgO + CaO + SrO + BaO | 0 to 10 |
| With $Li_2O$ + $Na_2O$ + $K_2O$ | 0 to 10; | and from 0 to 1.5 percent by weight of at least one refining agent, wherein said at least one refining agent is selected from the group consisting of $Sb_2O_3$, $As_2O_3$, $SnO_2$ and $CeO_2$.

3. An optical glass having an index of refraction ($n_d$) greater than or equal to 1.71, an Abbénumber ($v_d$) greater than or equal to 39 and a density ($\rho$) less than or equal to 4.7 g/cm³, wherein said optical glass consists of (in percent by weight on an oxide basis):

| | |
|---|---|
| $La_2O_3$ | 32 to 42 |
| $B_2O_3$ | 30 to 40 |
| $Al_2O_3$ | 0 to 5 |
| PbO | 0.5 to 4 |
| $Li_2O$ | 0 to 8 |
| $Na_2O$ | 0 to 8 |
| $K_2O$ | 0 to 8 |
| MgO | 0 to 8 |
| CaO | 0 to 8 |
| SrO | 0 to 8 |
| BaO | 0 to 8 |
| ZnO | 2 to 8 |
| $TiO_2$ | 0 to 2 |
| $ZrO_2$ | 3 to 10 |
| $Y_2O_3$ | 1 to 5 |
| $Yb_2O_3$ | 0.5 to 2 |
| $Gd_2O_3$ | 0.1 to 3 |
| $Nb_2O_5$ | 4 to 10 |
| With MgO + CaO + SrO + BaO | 0 to 10 |
| With $Li_2O$ + $Na_2O$ + $K_2O$ | 0 to 10; | and from 0 to 1.5 percent by weight of at least one refining agent, wherein said at least one refining agent is selected from the group consisting of $Sb_2O_3$, $As_2O_3$, $SnO_2$ and $CeO_2$.

4. An optical glass having an index of refraction ($n_d$) greater than or equal to 1.71, an Abbénumber ($v_d$) greater than or equal to 39 and a density ($\rho$) less than or equal to 4.7 g/cm³, wherein said optical glass consists of (in percent by weight on an oxide basis):

| | |
|---|---|
| $La_2O_3$ | 35 to 50 |
| $B_2O_3$ | 30 to 40 |
| $Al_2O_3$ | 0 to 5 |
| $SiO_2$ | 0 to 8 |
| $GeO_2$ | 0.5 to 15 |
| $Li_2O$ | 0 to 10 |
| $Na_2O$ | 0 to 10 |
| $K_2O$ | 0 to 10 |
| $Rb_2O$ | 0 to 10 |
| $Cs_2O$ | 0 to 10 |
| SrO | 0 to 2 |
| BaO | 0.1 to 7 |
| ZnO | 0 to 5 |
| $ZrO_2$ | 0.1 to 8 |
| $Y_2O_3$ | 0.1 to 6 |
| $Gd_2O_3$ | 0 to 5 |
| $Nb_2O_5$ | 1 to 10 |
| With $Li_2O$ + $Na_2O$ + $K_2O$ + $Rb_2O$ + $Cs_2O$; | 0 to 10 | and from 0 to 1.5 percent by weight of at least one refining agent, wherein said at least one refining agent is selected from the group consisting of $Sb_2O_3$, $As_2O_3$, $SnO_2$ and $CeO_2$.

5. An optical glass having an index of refraction ($n_d$) greater than or equal to 1.71, an Abbénumber ($v_d$) greater than or equal to 39 and a density ($\rho$) less than or equal to 4.7 g/cm³, wherein said optical glass consists of (in percent by weight on an oxide basis):

| | |
|---|---|
| $La_2O_3$ | 38 to 48 |
| $B_2O_3$ | 30 to 40 |
| $Al_2O_3$ | 0 to 5 |
| $SiO_2$ | 0 to 5 |
| $GeO_2$ | 0.5 to 13 |
| With $SiO_2$ + $GeO_2$ | 5 to 13 |
| $Li_2O$ | 0 to 8 |
| $Na_2O$ | 0 to 8 |
| $K_2O$ | 0 to 8 |
| SrO | 0 to 2 |
| BaO | 0.1 to 5 |
| ZnO | 0 to 3 |
| $ZrO_2$ | 0.5 to 6 |
| $Y_2O_3$ | 0.1 to 4 |
| $Nb_2O_5$ | 3 to 7 |
| With $Li_2O$ + $Na_2O$ + $K_2O$ + $Rb_2O$ +$Cs_2O$; | | and from 0 to 1.5 percent by weight of at least one refining agent, wherein said at least one refining agent is selected from the group consisting of $Sb_2O_3$, $As_2O_3$, $SnO_2$ and $CeO_2$.

6. The optical glass as defined in claim 1, 2, 3, 4 or 5, in the form of an optical element for an optical data transfer device.

7. The optical glass as defined in claim 1, 2, 3, 4 or 5, in the form of an optical element for an optical data transfer device and wherein said Abbénumber ($v_d$) is greater than or equal to 40 and said density ($\rho$) is less than or equal to 4.3 g/cm³.

* * * * *